(12) United States Patent
Solomonov et al.

(10) Patent No.: US 9,582,920 B2
(45) Date of Patent: Feb. 28, 2017

(54) SYSTEMS, METHODS, AND COMPUTER-READABLE MEDIA FOR EFFICIENTLY PROCESSING GRAPHICAL DATA

(75) Inventors: Dmitriy Solomonov, Sunnyvale, CA (US); Aram Lindahl, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1733 days.

(21) Appl. No.: 12/872,530

(22) Filed: Aug. 31, 2010

(65) Prior Publication Data

US 2012/0050259 A1 Mar. 1, 2012

(51) Int. Cl.
*G06T 15/00* (2011.01)

(52) U.S. Cl.
CPC .................. *G06T 15/005* (2013.01)

(58) Field of Classification Search
CPC .............. G06Q 10/04; G06Q 10/0639; G06Q 30/0201; G06Q 30/0283; G06T 11/00; G06T 15/50; G06T 1/20; G06T 15/00; G06T 15/04; G06T 19/20; H04L 63/08; H04L 63/20; H04L 63/10; H04L 63/0272
USPC ........................................................ 345/502
See application file for complete search history.

(56) References Cited

U.S. PATENT DOCUMENTS

| 6,249,294 | B1 | 6/2001 | Lefebvre et al. |
| 6,882,346 | B1 * | 4/2005 | Lefebvre ............... G06T 15/005 |
| | | | 345/505 |
| 7,102,653 | B2 | 9/2006 | Alcorn et al. |
| 7,477,256 | B1 | 1/2009 | Johnson |
| 7,522,167 | B1 | 4/2009 | Diard et al. |
| 7,629,978 | B1 | 12/2009 | Diard |
| 8,064,688 | B2 * | 11/2011 | Schneiderman ... G06K 9/00241 |
| | | | 382/159 |
| 2002/0072956 | A1 * | 6/2002 | Willems ................. G06Q 10/04 |
| | | | 705/7.31 |
| 2008/0284798 | A1 * | 11/2008 | Weybrew .............. G06T 15/503 |
| | | | 345/630 |
| 2009/0167768 | A1 | 7/2009 | Bull et al. |

* cited by examiner

*Primary Examiner* — Kee M Tung
*Assistant Examiner* — Xin Sheng
(74) *Attorney, Agent, or Firm* — Blank Rome LLP

(57) ABSTRACT

Systems, methods, and computer-readable media for efficiently processing graphical data using an electronic device are provided. A characteristic of graphical data may be identified and compared to a threshold. Based on whether the identified characteristic meets the threshold, the graphical data may be rendered either entirely by a first type of graphical processing unit or by both the first type of graphical processing unit and by a second type of graphical processing unit.

21 Claims, 6 Drawing Sheets

SYSTEMS, METHODS, AND COMPUTER-READABLE MEDIA FOR EFFICIENTLY PROCESSING GRAPHICAL DATA

FIELD OF THE INVENTION

This can relate to systems, methods, and computer-readable media for processing graphical data and, more particularly, to systems, methods, and computer-readable media for efficiently rendering graphical data using an electronic device.

BACKGROUND OF THE DISCLOSURE

Electronic devices, and in particular portable electronic devices (e.g., portable media players and cellular telephones), often include a graphical display system for generating and rendering graphical data representations of two-dimensional and three-dimensional objects that may be animated on a display for presentation to a user. Such a graphical display system may include a first type of graphics processing unit configured to render three-dimensional graphical data and a second type of graphics processing unit configured to render only two-dimensional graphical data. The graphical display system may be operative to use one or the other of these different types of graphical processing units depending on the type of graphical data being rendered. However, due to processing limitations, power limitations, and other limitations of such electronic devices, certain graphical data rendering techniques may be compromised or forsaken.

SUMMARY OF THE DISCLOSURE

Systems, methods, and computer-readable media for efficiently rendering graphical data using an electronic device are provided.

For example, in some embodiments, there is provided a method for processing graphical data. The method may include identifying a characteristic of the graphical data and determining if the characteristic meets a threshold. In response to a determination that the identified characteristic does not meet the threshold, the method may include rendering the graphical data with a first type of graphics processing unit and with a second type of graphics processing unit. Moreover, in response to a determination that the identified characteristic does meet the threshold, the method may include rendering the graphical data with the first type of graphics processing unit but not with the second type of graphics processing unit. For example, the graphical data may include a first portion of graphical data that requires three-dimensional rendering and a second portion of graphical data that requires two-dimensional rendering. The first type of graphics processing unit may be a three-dimensional graphics processing unit and the second type of graphics processing unit is a two-dimensional graphics processing unit. The characteristic may be the ratio of the pixel area of the first portion of graphical data to the pixel area of the second portion of graphical data, and the threshold may be at least one.

In other embodiments, there is provided a method for processing graphical data that may include calculating a first cost of rendering the graphical data using only a first type of graphics processing unit, calculating a second cost of rendering the graphical data using both the first type of graphics processing unit and a second type of graphics processing unit, and determining if the calculated first cost is greater than the calculated second cost. In response to a determination that the calculated first cost is greater than the calculated second cost, the method may also include rendering the graphical data using both the first type of graphics processing unit and the second type of graphics processing unit. Moreover, in response to a determination that the calculated first cost is not greater than the calculated second cost, the method may also include rendering the graphical data using only the first type of graphics processing unit. The graphical data may include a first portion of graphical data that requires three-dimensional rendering and a second portion of graphical data that requires two-dimensional rendering, while the first type of graphics processing unit may be a three-dimensional graphics processing unit and the second type of graphics processing unit may be a two-dimensional graphics processing unit. Calculating the first cost may include evaluating at least one of pixel area cost, context switch overhead cost, and memory cost of rendering the graphical data using only the first type of graphics processing unit, while calculating the second cost may include evaluating at least one of pixel area cost, context switch overhead cost, and memory cost of rendering the graphical data using both the first type of graphics processing unit and a second type of graphics processing unit.

In yet other embodiments, there is provided an electronic device that may include a screen processing module that generates graphical data. The graphical data may include a first data portion of a first type of data and a second data portion of a second type of data. The electronic device may also include a decision processing module that may determine if a first cost of rendering the graphical data according to a first mode of the device is greater than a second cost of rendering the graphical data according to a second mode of the device. Moreover, the electronic device may include a first graphics processing unit that renders the first data portion of the graphical data and the second data portion of the graphical data when the decision processing module determines that the first cost is not greater than the second cost, and that renders at least the first data portion of the graphical data when the decision processing module determines that the first cost is greater than the second cost. Furthermore, the electronic device may include a second graphics processing unit that renders no portion of the graphical data when the decision processing module determines that the first cost is not greater than the second cost, and that renders at least some of the second data portion of the graphical data when the decision processing module determines that the first cost is greater than the second cost.

In still yet other embodiments, there is provided computer readable media for controlling an electronic device. The computer readable media may include computer readable code recorded thereon for identifying a characteristic of graphical data generated by the electronic device and determining if the characteristic meets a threshold. Moreover, in response to a determination that the identified characteristic does not meet the threshold, the computer readable media may include computer readable code recorded thereon for rendering the graphical data using both a first graphics processing unit of the electronic device and a second graphics processing unit of the electronic device. Furthermore, in response to a determination that the identified characteristic does meet the threshold, the computer readable media may include computer readable code recorded thereon for rendering the graphical data using only the first graphics processing unit.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION OF THE DISCLOSURE

Systems, methods, and computer-readable media for efficiently rendering graphical data using an electronic device are provided and described with reference to FIGS. 1-6.

Figure 1:
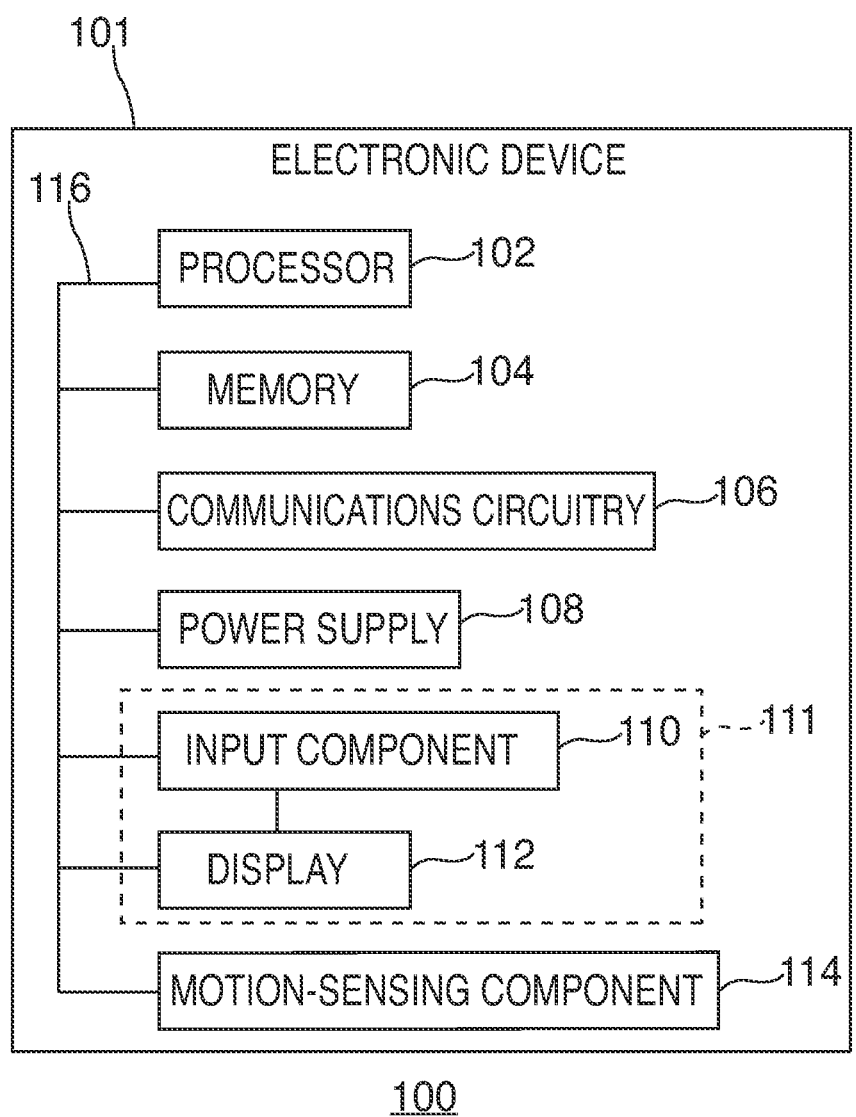
FIG. 1 is a schematic view of an illustrative electronic device for processing graphical data, in accordance with some embodiments of the invention.

FIG. 1 is a schematic view of an illustrative electronic device 100 for processing graphical data in accordance with some embodiments of the invention. Electronic device 100 may be any portable, mobile, or hand-held electronic device configured to process graphical data wherever the user travels. Alternatively, electronic device 100 may not be portable at all, but may instead be generally stationary. Electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, electronic device 100 may perform a single function (e.g., a device dedicated to processing graphical data) and, in other embodiments, electronic device 100 may perform multiple functions (e.g., a device that processes graphical data, plays music, and receives and transmits telephone calls).

Electronic device 100 may include a processor or control circuitry 102, memory 104, communications circuitry 106, power supply 108, input component 110, display 112, and motion sensing component 114. Electronic device 100 may also include a bus 116 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 1. For example, electronic device 100 may include a compass, positioning circuitry, or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 106 may be provided to allow device 100 to communicate with one or more other electronic devices or servers using any suitable communications protocol. For example, communications circuitry 106 may support Wi-Fi (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 106 may also include circuitry that can enable device 100 to be electrically coupled to another device (e.g., a computer or an accessory device) and communicate with that other device, either wirelessly or via a wired connection.

Power supply 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100. For example, input component 110 can take a variety of forms, including, but not limited to, an electronic device pad, dial, click wheel, scroll wheel, touch screen, one or more buttons (e.g., a keyboard), mouse, joy stick, track ball, microphone, camera, proximity sensor, light detector, and combinations thereof. Each input component 110 can be configured to provide one or more dedicated control functions for making selections or issuing commands associated with operating device 100.

Electronic device 100 may also include one or more output components that may present information (e.g., graphical, audible, and/or tactile information) to a user of device 100. An output component of electronic device 100 may take various forms, including, but not limited to, audio speakers, headphones, audio line-outs, visual displays, antennas, infrared ports, rumblers, vibrators, or combinations thereof.

For example, electronic device 100 may include display 112 as an output component. Display 112 may include any suitable type of display or interface for presenting rendered graphical data to a user. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 112 can include a movable display or a projecting system for providing a display of content on a surface remote from electronic device 100, such as, for example, a video projector, a head-up display, or a three-dimensional (e.g., holographic) display. As another example, display 112 may include a digital or mechanical viewfinder, such as a viewfinder of the type found in compact digital cameras, reflex cameras, or any other suitable still or video camera.

In some embodiments, display 112 may include display driver circuitry, circuitry for driving display drivers, or both. Display 112 can be operative to display content (e.g., media playback information, application screens for applications implemented on electronic device 100, information regarding ongoing communications operations, information regarding incoming communications requests, device operation screens, etc.) that may be under the direction of processor 102. Display 112 can be associated with any suitable characteristic length defining the size and shape of the display. For example, the display can be rectangular or have any other polygonal shape, or alternatively can be defined by a curved or other non-polygonal shape (e.g., a circular display). Display 112 can have one or more primary orientations for which an interface can be displayed, or can instead or in addition be operative to display an interface along any orientation selected by a user.

It should be noted that one or more input components and one or more output components may sometimes be referred to collectively herein as an input/output ("I/O") interface (e.g., input component 110 and display 112 as I/O interface 111). It should also be noted that input component 110 and display 112 may sometimes be a single I/O component, such as a touch screen that may receive input information through a user's touch of a display screen and that may also provide visual information to a user via that same display screen.

Motion-sensing component 114 may be operative to detect movement of electronic device 100. In some embodiments, motion-sensing component 114 can include one or more three-axis acceleration motion-sensing components (e.g., an accelerometer) that may be operative to detect linear acceleration in three directions. As another example, motion-sensing component 114 can include one or more two-axis acceleration motion-sensing components that may be operative to detect linear acceleration along each of two axes. In some embodiments, motion-sensing component 114 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezoresistance type accelerometer, or any other suitable accelerometer.

In some embodiments, motion-sensing component 114 can indirectly detect rotation, rotational movement, angular displacement, tilt, position, orientation, motion along a non-linear (e.g., arcuate) path, or any other non-linear motions. For example, if motion-sensing component 114 is a linear motion-sensing component, additional processing can be used to indirectly detect some or all of the non-linear motions. For example, by comparing the linear output of motion-sensing component 114 with a gravity vector (i.e., a static acceleration), motion-sensing component 114 may calculate the tilt of electronic device 100 with respect to a particular axis (e.g., a y-axis). In some embodiments, motion-sensing component 114 may alternatively or additionally include one or more gyro-motion-sensing components or gyroscopes for directly detecting rotational movement. For example, motion-sensing component 114 can include a rotating or vibrating element. As another example, motion-sensing component 114 can include a magnometer operative to detect the orientation of device 100 relative a magnetic north pole. Electronic device 100 may monitor changes in the output of the magnometer to detect rotations of the device. Using motion-sensing component 114, electronic device 100 can determine a preferred orientation for a user interface to display on display 112, for example.

Processor 102 of device 100 may include any processing circuitry operative to control the operations and performance of one or more components of electronic device 100. For example, processor 102 may be used to run operating system applications, firmware applications, media playback applications, media editing applications, or any other application. In some embodiments, processor 102 may receive input signals from input component 110 and/or drive output signals through display 112. Processor 102 may load a user interface program (e.g., a program stored in memory 104 or another device or server) to determine how instructions or data received via an input component 110 or motion-sensing component 114 may manipulate the way in which information is stored and/or provided to the user via an output component (e.g., display 112). Electronic device 100 (e.g., processor 102, memory 104, or any other components available to device 100) may be configured to process graphical data at various resolutions, frequencies, intensities, and various other characteristics as may be appropriate for the capabilities and resources of device 100.

Electronic device 100 may also be provided with a housing 101 that may at least partially enclose one or more of the components of device 100 for protecting them from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 2:
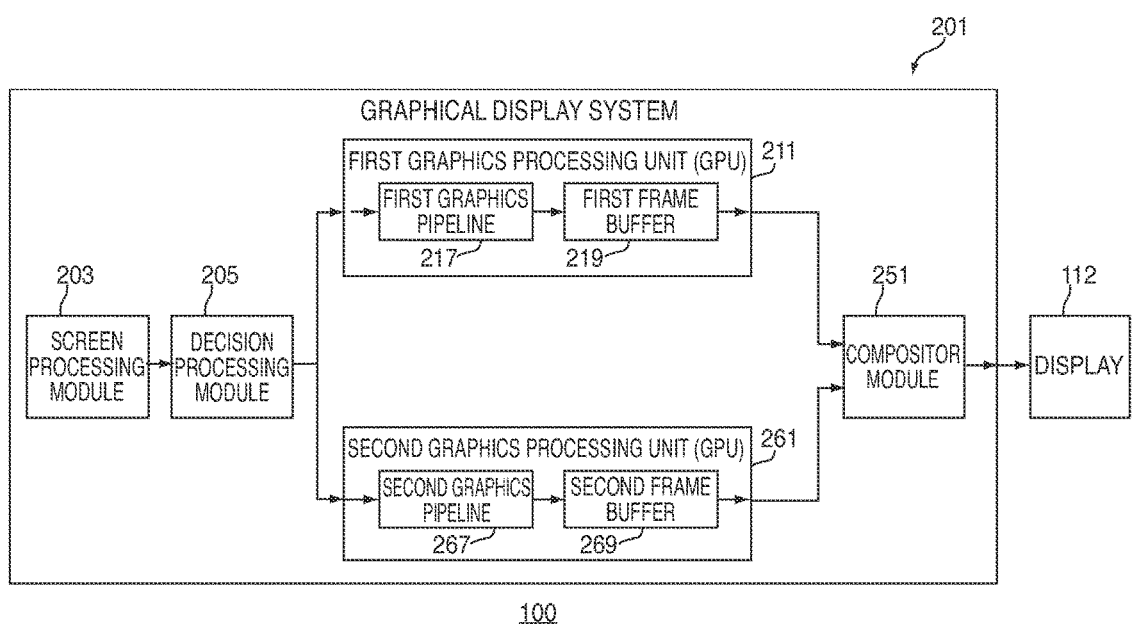
FIG. 2 is a schematic view of an illustrative portion of the electronic device of FIG. 1, in accordance with some embodiments of the invention.

FIG. 2 shows a schematic view of a graphical display system 201 of electronic device 100 that may be provided to generate and render graphical data for presentation on display 112. For example, in some embodiments, graphical display system 201 may generate and render graphical data representations of two-dimensional and/or three-dimensional objects that may define a visual screen of information to be presented as an image on a two dimensional display, such as display 112. Graphical display systems, such as graphical display system 201, for example, may be configured to generate and render realistic animated images in real time (e.g., using about 30 or more screens or frames per second) for display to a user on display 112.

As shown in FIG. 2, for example, graphical display system 201 may include a screen processing module 203 that may define and generate the graphical contents of each of the screens to be rendered for display. Such graphical screen contents may be based on the one or more applications being run by electronic device 100 as well as any input instructions being received by device 100 (e.g., via input component 110 and/or motion-sensing component 114). The graphical screen content information for each screen generated by screen processing module 203 may be provided to one or more graphics processing units ("GPUs") of system 201, such as a first graphics processing unit 211, for rendering.

In some embodiments, first GPU 211 may include a first graphics pipeline 217 and a first frame buffer 219. First graphics pipeline 217 may be configured to render the graphical screen content information for each screen that pipeline 217 may receive from screen processing module 203. For example, first graphics pipeline 217 may be configured to perform various types of graphics computations or processing techniques and/or implement various rendering algorithms on the received screen content information for a given screen so that first pipeline 217 may render the graphical data necessary to define at least a portion of the image to be displayed on display 112 for that screen. Such processing may include, but is not limited to, matrix transformations, scan-conversions, various rasterization techniques, various techniques for three-dimensional vertices and/or three-dimensional primitives, texture blending, and the like.

The graphical data rendered by first pipeline 217 for a given screen may include one or more sets of pixel data, each of which may be associated with a respective pixel to be displayed by display 112 when presenting that particular screen's visual image to a user of device 100. For example, each of the sets of pixel data included in the graphical data rendered by first pipeline 217 for a given screen may be correlated with coordinate values that identify a particular one of the pixels to be displayed by display 112, and each pixel data set may include a color value for its particular pixel as well as any additional information that may be used to appropriately shade or provide other cosmetic features for its particular pixel. The graphical data rendered by first pipeline 217 for a given screen may be stored in first frame buffer 219, and first frame buffer 219 may be configured to transmit all of the pixel data sets of the rendered graphical data stored therein for a particular screen to display 112 via any suitable process.

In some embodiments, as shown in FIG. 2, graphical display system 201 may include at least two graphics processing units, such as first GPU 211 and a second GPU 261. Second GPU 261 may include a second graphics pipeline 267 and a second frame buffer 269. Like first graphics pipeline 217, second graphics pipeline 267 may be configured to render the graphical screen content information for each screen that pipeline 267 may receive from screen processing module 203. For example, second graphics pipeline 267 may be configured to perform various types of graphics computations or processing techniques and/or implement various rendering algorithms on the received screen content information for a given screen so that second pipeline 267 may render the graphical data necessary to define at least a portion of the image to be displayed on display 112 for that screen.

The graphical data rendered by second pipeline 267 for a given screen may include one or more sets of pixel data, each of which may be associated with a respective pixel to be displayed by display 112 when presenting that particular screen's visual image to a user of device 100. For example, each of the sets of pixel data included in the graphical data rendered by second pipeline 267 for a given screen may be correlated with coordinate values that identify a particular one of the pixels to be displayed by display 112, and each pixel data set may include a color value for its particular pixel as well as any additional information that may be used to appropriately shade or provide other cosmetic features for its particular pixel. The graphical data rendered by second pipeline 267 for a given screen may be stored in second frame buffer 269, and second frame buffer 269 may be configured to transmit all of the pixel data sets of the rendered graphical data stored therein for a particular screen to display 112 via any suitable process.

Graphical display system 201 may include a compositor module 251, which may be configured to receive and combine or composite the rendered graphical data streams from the frame buffer of each GPU for a particular screen to be provided on display 112. For example, compositor module 251 may receive a stream of rendered graphical data from each one of GPU 211 and GPU 261 and may combine the data into a single stream of data that may then be provided to display 112 for displaying a screen image. In some embodiments, one or more compositor modules 251 may be provided to compose user interface elements in conjunction with screen processing module 203 before the graphical data representative of such user interface elements are provided to one or more GPUs for rendering. In other embodiments, one or more compositor modules 251 may be implemented with a specific GPU or a combination of specific GPUs. In some embodiments, compositor module 251 may be a software construct, one or more hardware components, or a combination thereof. Moreover, in some embodiments, each GPU need not be provided with its own frame buffer. I some embodiments, each GPU may share a same frame buffer. For example, first GPU 211 and second GPU 261 may work out of the same frame buffer, which may be provided within a shared module, such as a shared compositor module 251. It is also to be understood that, in some embodiments, graphical display system 201 may not include a compositor module.

Each of the graphics processing units of graphical display system 201 (e.g., first GPU 211 and second GPU 261) may be configured identically, for example, such that a particular portion of graphical screen content information generated by screen processing module 203 can be rendered by either GPU with substantially identical results. Alternatively, different graphics processing units of graphic display system 201 may be configured differently, such that each GPU may be specifically tailored to render at least one specific type of data in a specific way. For example, in some embodiments, first pipeline 217 of first GPU 211 may be configured to implement a first set of rendering algorithms or processing techniques so that first GPU 211 may be configured to render a first type of graphical data generated as graphical screen content by screen processing module 203 more efficiently than a second type of graphical data, while second pipeline 267 of second GPU 261 may be configured to implement a second set of rendering algorithms or processing techniques so that second GPU 261 may be configured to render a second type of graphical data generated as graphical screen content by screen processing module 203 more efficiently than the first type of graphical data. Therefore, in such embodiments, graphical display system 201 may run more efficiently when the first type of graphical screen content generated by screen processing module 203 is rendered by first GPU 211 and the second type of graphical screen content generated by screen processing module 203 is rendered by second GPU 261.

For example, in some embodiments, the graphical screen content information generated by screen processing module 203 for a screen to be displayed by display 112 may include two-dimensional ("2D") graphical data representative of one or more two-dimensional objects and/or three-dimensional ("3D") graphical data representative of one or more three-dimensional objects. Due to various additional rendering techniques that may be used to render 3D graphical data but that may not be used to render 2D graphical data (e.g., rasterization, three-dimensional vertices rendering, and/or three-dimensional primitives rendering), a GPU that may be configured to render 3D graphical data may place additional demands on graphical display system 201 when rendering data than might a GPU configured to render only 2D graphical data. Therefore, graphical display system 201 may be utilized more efficiently if 3D graphical data generated by screen processing module 203 is rendered by a GPU configured to render 3D graphical data and if at least some 2D graphical data generated by screen processing module 203 is rendered by a GPU configured to only render 2D graphical data.

Thus, in some embodiments, first pipeline 217 of first GPU 211 may be configured to implement a first set of rendering algorithms or processing techniques so that first GPU 211 may be able to render 3D graphical data (i.e., GPU 211 may be a "3D-rendering GPU" or "3D GPU"), while second pipeline 267 of second GPU 261 may be configured to implement a second set of rendering algorithms or processing techniques so that second GPU 261 may render only 2D graphical data and not 3D graphical data (i.e., GPU 261 may be a "2D-rendering GPU" or "2D GPU"). For example, in some embodiments, first GPU 211 may be configured to utilize OpenGL Protocol ("OGL") so that first GPU 211 may render 3D graphical data and 2D graphical data, while second GPU 261 may be configured to utilize X Protocol so that second GPU 261 may render 2D graphical data but not 3D graphical data. In such embodiments, graphical display system 201 may be utilized more efficiently if 3D graphical data generated by screen processing module 203 is provided to 3D-rendering GPU 211 and if at least some 2D graphical data generated by screen processing module 203 is provided to 2D-rendering GPU 261 and not to 3D-rendering GPU 211. It is to be understood that, in some embodiments, a first type of GPU may be configured to render three-dimensional graphical data better or more efficiently than a second type of GPU, despite the fact that both types of GPU may be configured to render three-dimensional graphical data. For example, both a first type of GPU and a second type of GPU may be able to rasterize graphical data, although the first type of GPU may be configured to do so more efficiently (e.g., while requiring less power or at a faster speed). Moreover, a second type of GPU may be configured to more efficiently conduct two-dimensional rendering operations than a first type of GPU, despite the fact that both GPU types may be configured to conduct such two-dimensional rendering operations.

However, system 201 may incur a cost by switching between providing a first portion of graphical data generated by screen processing module 203 to first GPU 211 and providing a second portion of graphical data generated by screen processing module 203 to second GPU 261. For example, it may take a certain amount of time to switch the destination GPU of graphical data being generated by screen processing module 203. For example, certain GPUs may be configured to handle long command streams, and having a GPU intermittently stop rendering and wait for other GPUs to render data may not be the most efficient use of the GPUs. Additionally or alternatively, it may take a certain amount of time or additional power to turn on a GPU that had previously been powered down, for example, due to inactivity. Whatever the reasons, a context switch overhead may be incurred when system 201 switches between rendering data with a first GPU and rendering data with a second GPU. Therefore, while it may be more efficient to render different types of data with different GPUs, the switch overhead that may be required to direct the different data types to different GPUs may reduce or even negate the amount of system resources that might otherwise be saved by using different GPUs. Accordingly, it may be more efficient to render all the graphical data generated by screen processing module 203 for a particular screen using a 3D-rendering GPU, despite the fact that the graphical data may include portions of graphical data that do not require three-dimensional rendering operations.

System 201 may be provided with a decision processing module 205 that may analyze the graphical data generated by screen processing module 203 and determine how to distribute that data for rendering amongst the GPUs available to system 201. For example, decision module 205 may determine whether to provide different portions of the generated graphical data to different types of GPUs or whether to provide all of the graphical data to one or more GPUs of the same type. An illustrative example of how decision processing module 205 may analyze graphical data generated by screen processing module 203 may be explained with reference to FIGS. 3 and 4.

Figure 3:
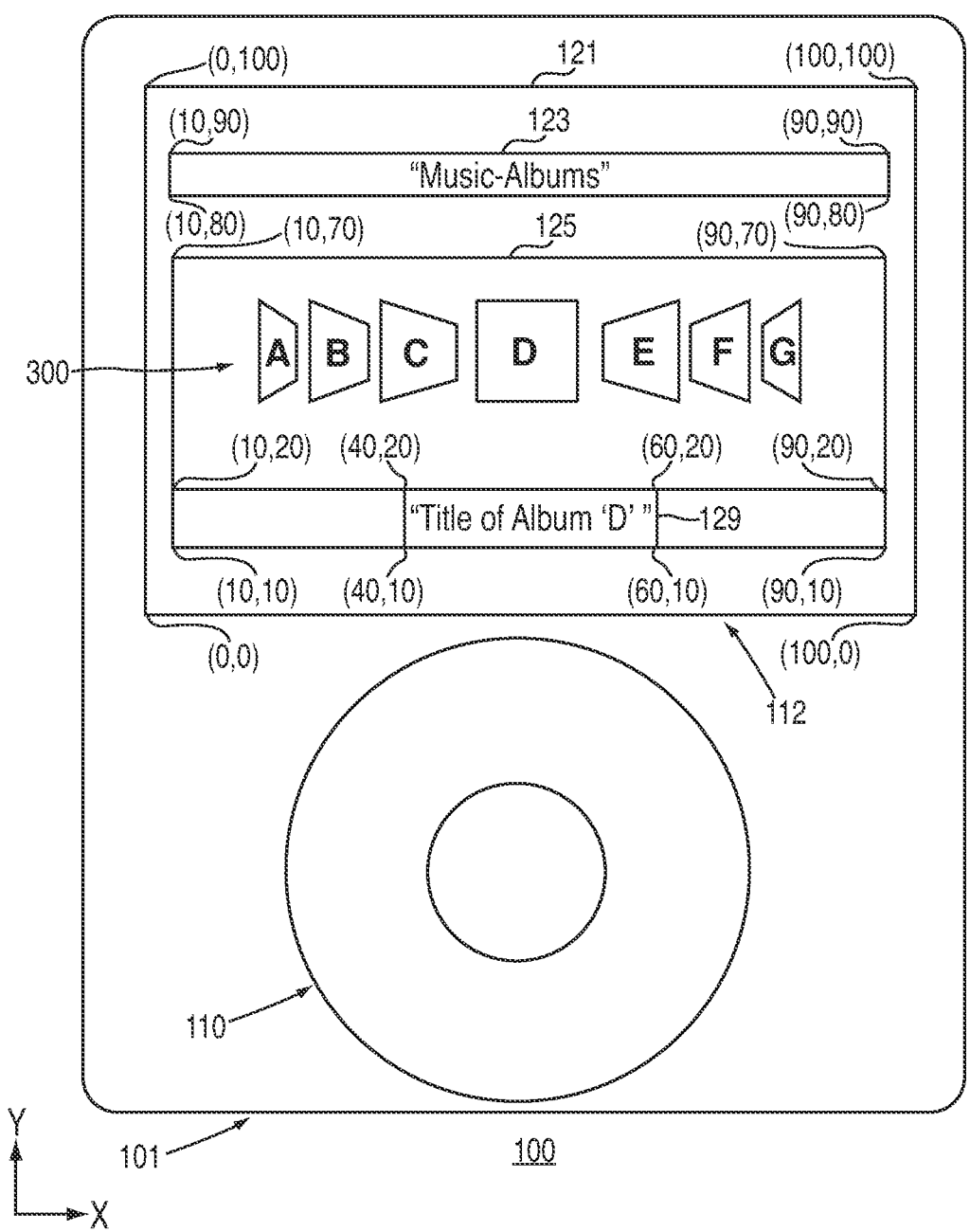
FIG. 3 is a front view of the electronic device of FIGS. 1 and 2, presenting an exemplary screen of graphical data, in accordance with some embodiments of the invention.

FIG. 3, for example, shows electronic device 100 with housing 101, input component 110, and display 112 presenting an exemplary screen 300 of visual information that may be generated by screen processing module 203 and rendered by GPU 211 and/or GPU 261 of system 201. As shown, screen 300 may present an interface for a media application of device 100, in which a collection of music album covers may be rotationally and translationally moved across display 112 in response to user input (e.g., via input component 110) and in which text associated with one or more of the album covers and text associated with the current mode of the media application may be presented to a user (e.g., an interface that may be similar to the Cover Flow interface of many user interfaces provided by Apple Inc. of Cupertino, Calif.). It is to be understood, however, that screen 300 is merely exemplary, and display 112 may present any images representing any type of two-dimensional and/or three-dimensional animation that may be generated and rendered by graphical display system 201.

As shown, screen 300 may include an array of 100 pixels along its x-axis by 100 pixels along its y-axis, although it is to be understood, of course, that display 112 may be designed to present a screen of any suitable array of pixels. Screen 300 may include a master layer 121 that may span the entire pixel array of screen 300 (i.e., a 100×100 pixel array having an area of 10,000 pixels). Master layer 121 of screen 300 of FIG. 3 may include various sub-layers or children layers that combine to define the visual information of screen 300, and a hierarchical diagram 400 of a tree of these layers may be shown in FIG. 4.

For example, master layer 121 may include a menu layer 123 that may include an array of 80 pixels by 10 pixels that may be offset by 10 pixels from each one of the top edge and the left edge of master layer 121 (i.e., an 80×10 pixel array having an area of 800 pixels). Menu layer 123 may include text describing the current mode of device 100 (e.g., a "Music-Albums" mode of the media application of device 100). In some embodiments, as described below with respect to FIGS. 3 and 4, menu layer 123 may be considered a layer having one or more two-dimensional textures that may only require two-dimensional rendering operations. Master layer 121 may also include a place holder layer 125 that may include an array of 80 pixels by 60 pixels that may be offset by 10 pixels from each one of the bottom edge and the left edge of master layer 121 (i.e., an 80×60 pixel array having an area of 4,800 pixels). Place holder layer 125 may include various portions that can be animated within the current mode of device 100.

Place holder layer 125 may include an album cover layer 127 and an album title layer 129. For example, album cover layer 127 may include an array of 80 pixels by 50 pixels that may be offset by 10 pixels from the left edge and 30 pixels from the top edge of master layer 121 (i.e., an 80×50 pixel array having an area of 4,000 pixels). Album cover layer 127 may include a collection of music album covers (e.g., album covers "A"-"G") that may be rotationally and translationally moved across display 112. In some embodiments, as described below with respect to FIGS. 3 and 4, album cover layer 127 may be considered a layer having one or more two-dimensional textures that may only require three-dimensional rendering operations (e.g., graphical data that may need to be rendered by a GPU configured to do three-dimensional rendering and not just two-dimensional rendering). For example, in some embodiments of the interface of screen 300, each album cover of album cover layer 127 may be depicted as a three-dimensional object that may be animated to rotate about the y-axis as the cover is translated along the x-axis in the x-y plane of display 112 in consecutive frames of a generated display screen (e.g., when album cover "A" is animated from its position and orientation shown in FIG. 3 to the position and orientation of album cover "B" as shown in FIG. 3). Each one of the album covers presented in album cover layer 127 (e.g., album covers "A"-"G") may be defined using a mathematical or computerized three-dimensional model, such as a wireframe model, or by any other suitable method, such as claymation. In other embodiments, the album covers may instead be any other suitable three-dimensional objects. Although not depicted as such in FIG. 4, each one of album covers "A"-"G" may be considered its own layer within album cover layer 127, and each album cover may independently require only two-dimensional rendering or three-dimensional rendering depending on how the content of screen 300 is being manipulated in the context of the current interface.

Place holder layer 125 may also include an album title layer 129 that may include an array of 20 pixels by 10 pixels that may be offset by 40 pixels from the left edge and 10 pixels from the bottom edge of master layer 121 (i.e., a 20×10 pixel array having an area of 200 pixels). Album title layer 129 may include text describing the album cover currently centered within album cover layer 127 (e.g., the "Title of Album 'D'"). In some embodiments, as described below with respect to FIGS. 3 and 4, album title layer 129 may be considered a layer having one or more two-dimensional textures that may only require two-dimensional rendering operations.

Figure 4:
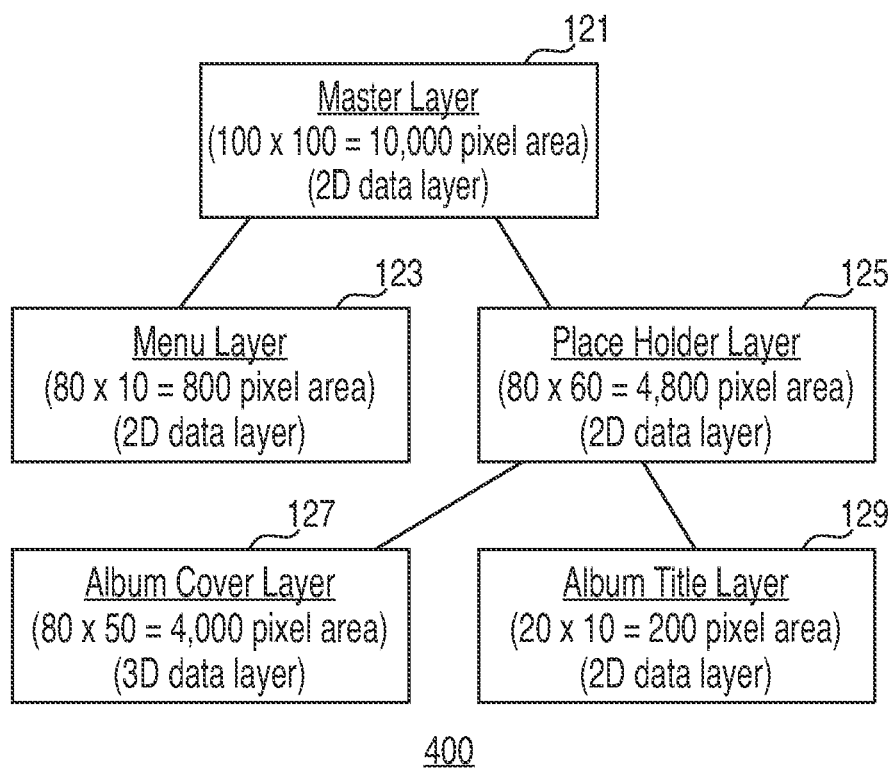
FIG. 4 is a hierarchical diagram of a tree of the graphical data layers of the screen of graphical data of FIG. 3, in accordance with some embodiments of the invention.

As shown in FIG. 4, album cover layer 127 and album title layer 129 may be children of place holder layer 125, and place holder layer 125 and menu layer 123 may be children of master layer 121 of screen 300. It is to be understood, however, that screen 300 is merely one example of countless types of display screens that may be generated by screen processing module 203 of system 201 for presentation on display 112, and that each generated screen 300 may have a tree diagram 400 that includes various numbers of layer branches, each of which may include various numbers of children data layers, and each data layer may be of any suitable pixel array size and may include graphical data of any suitable data type requiring any suitable type of rendering operation. For example, in other embodiments, the entire contents of master layer 121 may be considered to include various textures, each of which may require three-dimensional rendering (e.g., when the entire contents of master layer 121 is being rotated within the x-y plane about a z-axis, such as when the orientation of the contents of the user interface displayed on display 112 is to be rotated from a landscape orientation to a portrait orientation with respect to device 100). A parent layer may act as a container layer for its one or more children layers, and each parent layer may be used merely for ease of animation (e.g., if a parent layer is translated, all children layers of that parent layer may be translated by the same amount). According to some optimization techniques, a parent layer may allocate memory and its children may be rendered into the allocated memory, such that if a parent layer is animated, each of the children may not need to be re-rendered individually (e.g., some of the children layers may be flattened into a parent layer before animating that parent layer).

Decision processing module 205 of graphical display system 201 may be configured to analyze one or more characteristics (e.g., pixel area, data layer type, etc.) of each graphical data layer of screen 300 as generated by screen processing module 203. Based on this analysis, decision processing module 205 may determine to which type of GPU of system 201 each graphical data layer of screen 300 is to be sent for rendering. For example, in some embodiments, decision processing module 205 may analyze the combined pixel area of the data layers requiring three-dimensional rendering (e.g., the "three-dimensional data layers") of screen 300 as compared to the combined pixel area of the data layers requiring only two-dimensional rendering (e.g., the "two-dimensional data layers") of screen 300. Based on this analyzed comparison, decision module 205 may determine whether it would be more efficient for system 201 to render all the data layers of screen 300 using a first type of GPU, or whether it would be more efficient for system 201 to render at least some of the data layers of screen 300 using a second type of GPU and other data layers of screen 300 using the first type of GPU. In such embodiments, the first type of GPU may be a GPU type configured to render three-dimensional data, while the second type of GPU may be a GPU type configured to only render two-dimensional data, or a GPU type configured to render two-dimensional data more efficiently than the first type of GPU, or a GPU type configured to render three-dimensional data less efficiently than the first type of GPU. Following the same example, such an analysis of screen 300 may determine that there is a combined area of 4,000 pixels of 3D data amongst all the 3D data layers of screen 300 (i.e., album cover layer 127, although in other embodiments there may be more or less than one 3D data layer in a screen generated by screen module 203) and a combined area of 15,800 pixels of 2D data amongst all the 2D data layers of screen 300 (i.e., 10,000 pixels of master layer 121, 800 pixels of menu layer 123, 4,800 pixels of place holder layer 125, and 200 pixels of album title layer 129).

Then, based on a value of this analyzed ratio (e.g., a 3D area of 4,000 pixel versus a 2D area of 15,800 pixels), decision module 205 may then determine whether to provide each data layer of screen 300 to a first type of GPU or whether to provide at least one of the 2D data layers of screen 300 to a second type of GPU. For example, as mentioned, the first type of GPU may be a GPU type configured to render three-dimensional data while the second type of GPU may be a GPU type configured to only render two-dimensional data, or a GPU type configured to render two-dimensional data more efficiently than the first type of GPU, or a GPU type configured to render three-dimensional data less efficiently than the first type of GPU. In such embodiments, based on a value of this analyzed ratio, decision module 205 may then determine whether to provide each data layer of screen 300 to a first type of GPU configured to render 3D data (e.g., 3D-rendering GPU 211) using a "full 3D mode" of system 201, or whether to provide at least one of the 2D data layers of screen 300 to a second type of GPU at least configured to render 2D data but maybe not 3D data (e.g., 2D-rendering GPU 261) and at least one of the 3D data layers of screen 300 to the first type of GPU configured to render 3D data (e.g., 3D-rendering GPU 211) using a "partial 3D mode" of system 201.

For example, decision module 205 may be configured to compare this analyzed ratio or value with a threshold ratio or value, which may be pre-defined or otherwise generated and made available to decision module 205. In some embodiments, the threshold ratio may be defined based on the performance characteristics of the types of GPUs available to system 201, such as the amount of power each GPU type may consume while rendering a particular area of graphical data of a particular type, the amount of time each type of GPU may require to render a particular area of graphical data of a particular type, the amount of system resources it may require for system 201 to switch between rendering data with a first type of GPU and rendering data with a second type of GPU, and the like.

Based on the comparison between the analyzed ratio and the threshold ratio, decision module 205 may determine whether to have the graphical data of screen 300 rendered according to the full 3D mode or the partial 3D mode of system 201. For example, if the analyzed ratio is equal to or greater than the threshold, then the graphical data may be rendered according to the full 3D mode, and if the analyzed ratio is less than the threshold, then the graphical data may be rendered according to the partial 3D mode. Therefore, the value of the threshold may be used as a tilting point to determine whether an analyzed characteristic value is indicative of graphical data of a screen 300 that would be more efficient to render with only a first type of GPU of system 201 or a screen 300 that would be more efficient to render partially with a first type of GPU and partially with a second type of GPU of system 201. Accordingly, the system characteristics of system 201 used to define the value of the threshold may be critical in this process. As mentioned, the threshold value may vary based on the number and types of components provided by system 201, perhaps other components of device 100, and/or the performance of those components under various conditions. Therefore, decision processing module 205 may analyze one or more characteristics of the graphical data generated by screen processing module 203 with respect to one or more particular thresholds in order to determine how to efficiently distribute that graphical data for rendering amongst the types of GPUs available to system 201.

Examples of resources that may be saved by using system 201 as described above may include memory, power, processing operations, rendering time, and other types of resources available to device 100. The efficient rendering of graphical data may be especially important for portable electronic devices, where hardware and power resources may be limited. In particular, many portable electronic devices that do not contain a graphics card, or other hardware dedicated to performing the expensive computations required in animation, may benefit from system 201.

While graphical display system 201 is shown in FIG. 2 to include only first GPU 211 and second GPU 261, it is to be understood that system 201 may be provided with any suitable number of GPUs, each of which may any suitable type of GPU configured in any suitable manner. For example, in some embodiments, system 201 may be provided with two GPUs configured in a first manner (e.g., each as a 3D-rendering GPU) and five GPUs configured in a second manner (e.g., each as a 2D-rendering GPU). In other embodiments, system 201 may include three or more GPUs, each of which may be configured differently from each of the other GPUs in the system. Any two GPUs of the same type and/or any two GPUs of two different types may be configured to render data in parallel with one another and/or serially in system 201. Regardless of the number of GPUs in system 201, or the various types of GPUs in system 201, decision processing module 205 may be configured accordingly to make efficient use of the available GPUs based on its analysis of one or more characteristics of the graphical data generated by screen processing module 203 and based on one or more appropriate thresholds. For example, as described below, the way in which each characteristic may be analyzed, and the ay in which each threshold is defined, may vary based on various factors, such as the amount of power available to system 201, the thermal heat generated by various GPUT types of system 201, the pixel density of display 112, the context of the interface defined by screen 300, the memory available to system 201, and the like.

Each component of graphical display system 201 may be implemented via hardware, software, or any combination thereof, according to various embodiments. Each GPU may be implemented using any suitable technologies (e.g., as one or more integrated circuit devices), and different GPUs may or may not be identical in structure, capabilities, and operation. Any or all of the GPUs or other components of system 201 may be mounted on an expansion card, mounted directly on a system motherboard, or integrated into a system chipset component (e.g., into a "north bridge" chip). System 201 may include any amount of dedicated graphics memory, may include no dedicated graphics memory and may rely on device memory 104 of device 100, or may use any combination thereof. For example, first frame buffer 219 may be implemented in dedicated graphics memory of system 201 or may be provided by a portion of memory 104 available to other components of device 100. Screen processing module 203, decision processing module 205, and/or compositor module 251 may be integrated with a GPU or may be provided on a separate chip.

Furthermore, while two GPUs, each with its own respective frame buffer, are shown in FIG. 2, any number of GPUs can be included in graphical display system 201. Some or all of the GPUs of system 201 may share a common memory component. In some embodiments, the frame buffer and pipeline of a GPU may be implemented in a single integrated circuit device or in separate integrated circuit devices or chips.

Graphical display system 201 may be a dedicated system implemented using one or more expansion cards adapted for various bus standards. For example, all of the GPUs may be mounted on different interconnected expansion cards or all of the GPUs may be mounted on one expansion card. The GPUs of system 201 may interface with a motherboard or processor 102 of device 100 through an expansion slot (e.g., a peripheral component interconnect ("PCI") slot or a PCI express slot). Alternatively, system 201 need not be removable but may include one or more dedicated GPUs that may include memory (e.g., RAM) dedicated to the utilization of the GPU. In other embodiments, system 201 may be a graphics system integrated into device 100. For example, a GPU of system 201 may utilize a portion of device memory 104 of device 100. One or more of the components of graphical display system 201 (e.g., screen processing module 203, decision processing module 205, first pipeline 217, first frame buffer 219, second pipeline 267, second frame buffer 269, compositor module 251, etc.) may include its own processing circuitry and/or memory. Alternatively each component of graphical display system 201 may share processing circuitry and/or memory with any other component of graphical display system 201 and/or processor 102 and/or memory 104 of device 100.

Figure 5:
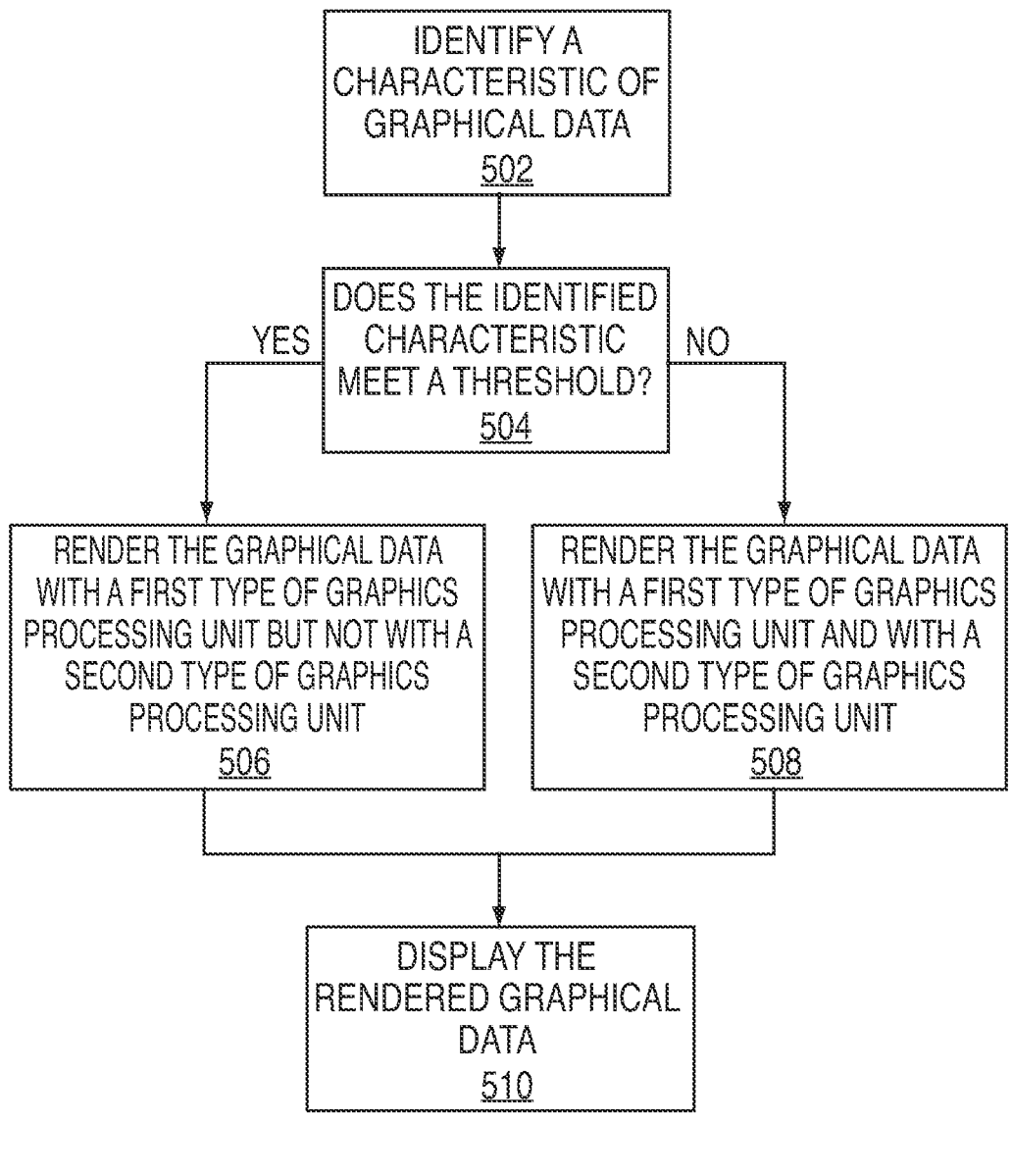
FIGS. 5 and 6 are flowcharts of illustrative processes for processing graphical data, in accordance with various embodiments of the invention.

FIG. 5 shows a flowchart of an illustrative process 500 for processing graphical data. Process 500 is often described with reference to the various device components of electronic device 100 of FIG. 1 and graphical display system 201 of FIG. 2, although any other suitable electronic device and graphical display system may operate or be operated upon according to process 500. Moreover, process 500 is often described with specific reference to the data layers of screen 300 of FIG. 3 and diagram 400 of FIG. 4, although process 500 may be followed by a device rendering any suitable graphical data screen having any suitable tree of data layers requiring various types of rendering at various times.

Process 500 may begin at step 502 by identifying at least one characteristic of graphical data to be rendered. For example, this may be accomplished by analyzing at least some of the graphical data layers of the graphical data to be rendered (e.g., a screen of graphical data generated by screen processing module 203). As mentioned, in some embodiments, decision processing module 205 may analyze the ratio of the combined pixel area of all the three-dimensional data layers of a generated screen with respect to the combined pixel area of all the two-dimensional data layers of the generated screen. In other embodiments, various other characteristics and/or ratios may be identified and analyzed by decision processing module 205.

Next, at step 504, process 500 may determine whether the characteristic or characteristics identified at step 502 meet at least one threshold. For example, as mentioned above, various performance characteristics of various components of graphical display system 201 or, more generally, device 100 may be used to define a threshold value utilized at step 504. Different thresholds may be defined and used at step 504 based on the one or more characteristics identified at step 502. An identified characteristic may be compared to a threshold to make a determination at step 504. As mentioned, in some embodiments, decision processing module 205 may determine whether the analyzed ratio of the combined pixel area of all the three-dimensional data layers of a generated screen with respect to the combined pixel area of all the two-dimensional data layers of the generated screen meets a particular threshold value. In other embodiments, decision processing module 205 may identify various characteristics other than, or in addition to, the ratio of 3D pixel area to 2D pixel area and may compare those other characteristics to other particular thresholds.

In some embodiments, a threshold to be used by process 500 may be generated by graphical display system 201 or another portion of device 100, for example, according to an application available to device 100. In some embodiments, the value of a particular threshold may change over time. For example, a threshold that may be based on a performance characteristic of a component of device 100 may change if the performance of such a component is determined to have changed (e.g., degraded after a certain amount of use). Thus, a value of a particular threshold to be used at step 504 may be constantly updated as various characteristics of device 100 change (e.g., based on the power available to power supply 108, the orientation of device 100 as detected by motion sensing component 114, etc.). In other embodiments, the value of a particular threshold may be fixed.

If it is determined at step 504 that at least one characteristic identified at step 502 does meet one or more particular thresholds, process 500 may proceed to step 506, and the graphical data may be rendered with a first type of graphics processing unit but not with a second type of graphics processing unit. For example, if a threshold is met at step 504, process 500 may proceed to step 506 and each one of the data layers of a generated screen of graphical data may be rendered by a first type of GPU (e.g., first GPU 211 configured as a 3D-rendering GPU), regardless of whether a data layer includes data requiring three-dimensional rendering or two-dimensional rendering (e.g., using a "full-3D mode" of system 201). In such an embodiment, none of the graphical data may be rendered by a second type of GPU (e.g., second GPU 261 configured as a 2D-rendering GPU).

Alternatively, if it is determined at step 504 that at least one characteristic identified at step 502 does not meet one or more particular thresholds, process 500 may proceed to step 508, and the graphical data may be rendered with a first type of graphics processing unit and with a second type of graphics processing unit (e.g., a first portion of the graphical data may be rendered with a first type of graphics processing unit and a second portion of the graphical data may be rendered with a second type of graphics processing unit). For example, if a threshold is not met at step 504, process 500 may proceed to step 508 and a first subset of the data layers of the generated screen of graphical data may be rendered using a first type of graphics processing unit and a second subset of the data layers of the generated screen of graphical data may be rendered using a second type of graphics processing unit.

As a more specific example, if a threshold is not met at step 504, process 500 may proceed to step 508 and at least some of the data layers that include data requiring three-dimensional rendering may be rendered by a 3D-rendering GPU (e.g., first GPU 211), and at least some of the data layers requiring two-dimensional rendering may be rendered by a 2D-rendering GPU (e.g., second GPU 261) (i.e., using a "partial-3D mode" of system 201). In some embodiments, all of the two-dimensional data layers of the generated screen of graphical data may be rendered by a 2D-rendering GPU (e.g., second GPU 261) at step 508. Alternatively, in other embodiments, only a first subset of the two-dimensional data layers of the generated screen of graphical data may be rendered by a 2D-rendering GPU (e.g., second GPU 261) and a second subset of the two-dimensional data layers of the generated screen of graphical data may be rendered by a 3D-rendering GPU (e.g., first GPU 211). Therefore, the determination made at step 504 may determine, for example, whether it would be more efficient for system 201 to render all the data layers of screen 300 using a first type of GPU configured to render data in a first particular manner (e.g., by proceeding to step 506) or whether it would be more efficient for system 201 to render at least some of the data layers of screen 300 using the first type of GPU and other data layers of screen 300 using a second type of GPU configured to render data in a second particular manner that may differ from the first particular manner of the first type of GPU (e.g., by proceeding to step 508).

After the graphical data has been rendered at step 506 or step 508, process 500 may proceed to step 510 and the rendered data may be displayed.

Following the example mentioned above, in which step 502 may identify the ratio of the combined pixel area of all the three-dimensional data layers of a generated screen with respect to the combined pixel area of all the two-dimensional data layers of the generated screen, a threshold used at step 504 may be any suitable value. For example, such a threshold may be equal to "at least one," in which case process 500 might proceed from step 504 to step 506 if the area of the three-dimensional layers is at least equal to the area of the two-dimensional layers (i.e., at least 50% of the graphical data may require three-dimensional rendering). In other embodiments, the threshold for this example may be any suitable number.

While process 500 of FIG. 5 has been described with respect to analyzing the ratio of 3D area to 2D area for a screen of graphical content to be rendered, it is to be understood that process 500 may identify any characteristic or combination of characteristics of graphical data to be rendered, and that process 500 may compare the one or more identified characteristics with one or more appropriate thresholds, in order to determine how to distribute the graphical data for rendering amongst the various types of graphical processing units that may be available to a graphical display system (e.g., to determine whether or not a graphical display system should render graphical data using a full 3D rendering mode or a partial 3D rendering mode). For example, other characteristics may include, but are not limited to, the time it may take to render a particular layer of data using each of the available types of GPU, the amount of power it may consume to render a particular layer of data using each of the available types of GPU, and the context switch overhead it may require to switch between rendering different layers of data using different types of available GPUs, for example.

Figure 6:
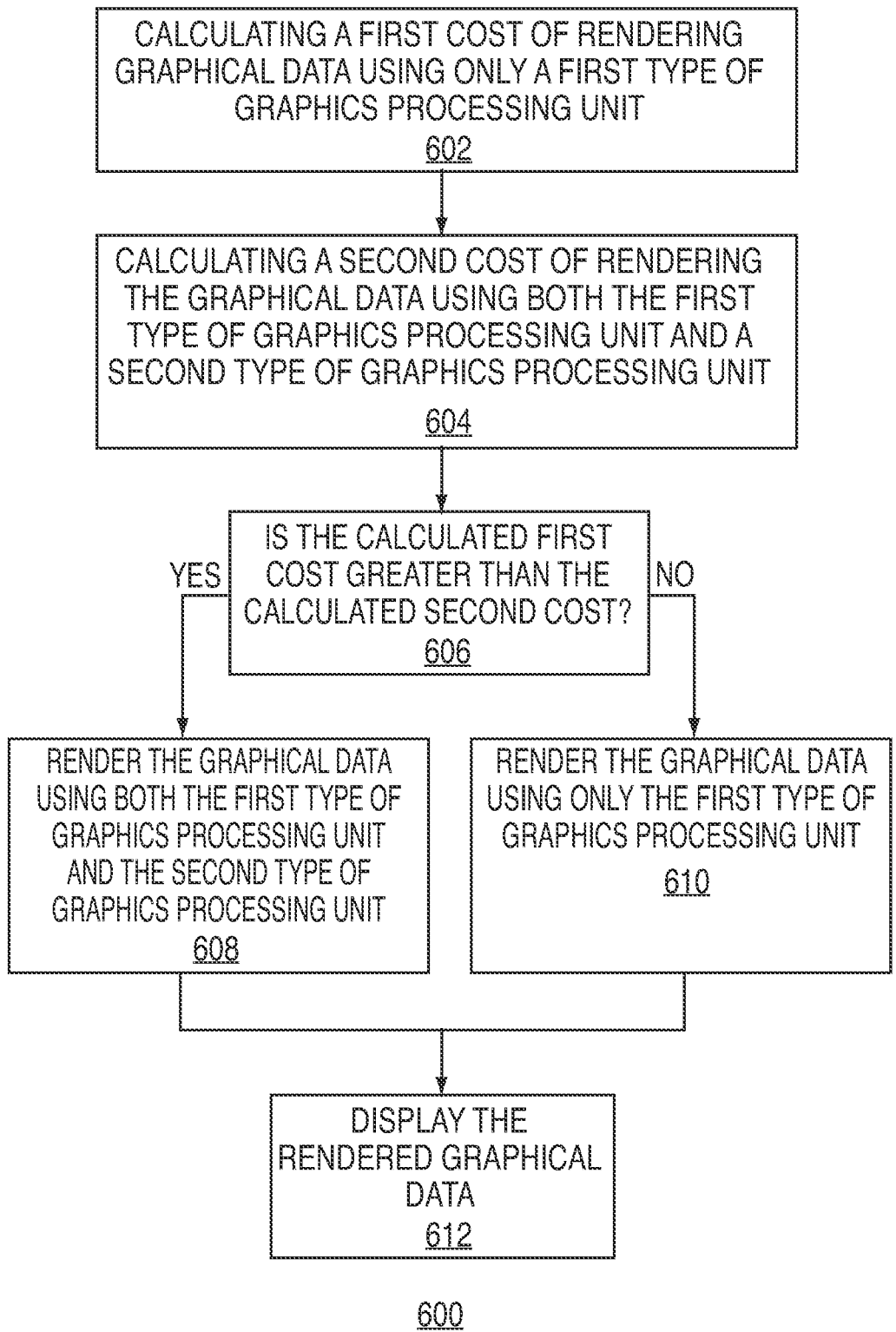

FIG. 6 shows a flowchart of another illustrative process 600 for processing graphical data. Like process 500, process 600 is often described with reference to the various device components of electronic device 100 of FIG. 1 and graphical display system 201 of FIG. 2, although any other suitable electronic device and graphical display system may operate or be operated upon according to process 600. Moreover, like process 500, process 600 is often described with specific reference to the data layers of screen 300 of FIG. 3 and diagram 400 of FIG. 4, although process 600 may be followed by a device rendering any suitable graphical data screen having any suitable tree of data layers requiring various types of rendering at various times.

Process 600 may begin at step 602 by calculating a first cost of rendering graphical data using only a first type of graphics processing unit. Next, at step 604, process 600 may continue by calculating a second cost of rendering the graphical data using both the first type of graphics processing unit and a second type of graphics processing unit. It is to be noted that, while in some embodiments calculating the first cost at step 602 may be done before calculating the second cost at step 604, in other embodiments, calculating the first cost at step 602 may be done after calculating the second cost at step 604. In yet other embodiments, calculating the first cost at step 602 may be done at the same time as calculating the second cost at step 604. After step 602 and step 604, process 600 may proceed to step 606. At step 606, process 600 may determine whether the first cost calculated at step 602 is greater than the second cost calculated at step 604.

For example, one or more of steps 602-606 may be accomplished by analyzing with decision processing module 205 at least some of the graphical data layers of the graphical data to be rendered (e.g., a screen of graphical data generated by screen processing module 203). In some embodiments, decision processing module 205 may execute a "CalculateCost" function on the graphical data to be rendered. Such a function may be executed in accordance with an algorithm or code available to decision processing module 205, for example, and may return two results.

A first result of such a "CalculateCost" function may be a "full 3D cost", which may be reflective of the amount of one or more resources of electronic device 100 that would be necessary to render the graphical data using only a first type of graphics processing unit available to device 100 (see, e.g., step 602 of process 600). A second result of such a "CalculateCost" function may be a "partial 3D cost", which may be reflective of the amount of one or more resources of electronic device 100 that would be necessary to render the graphical data using both a first type of graphics processing unit available to device 100 and a second type of graphics processing unit available to device 100 (see, e.g., step 604 of process 600). For example, the first type of graphics processing unit may be a GPU configured to render three-dimensional graphical data as well as two-dimensional graphical data, while the second type of graphics processing unit may be a GPU configured to render only two-dimensional graphical data but not three-dimensional data.

However, it is to be understood that, in some embodiments, a first type of GPU may be configured to render three-dimensional graphical data better or more efficiently than a second type of GPU, despite the fact that both types of GPU may be configured to render three-dimensional graphical data. For example, both a first type of GPU and a second type of GPU may be able to rasterize graphical data, although the first type of GPU may be configured to do so more efficiently (e.g., while requiring less power or at a faster speed). Moreover, a second type of GPU may be configured to more efficiently conduct two-dimensional rendering operations than a first type of GPU, despite the fact that both GPU types may be configured to conduct such two-dimensional rendering operations. Therefore, the first type of GPU may be a GPU type configured to render three-dimensional data, while the second type of GPU may be a GPU type configured to only render two-dimensional data, or a GPU type configured to render two-dimensional data more efficiently than the first type of GPU, or a GPU type configured to render three-dimensional data less efficiently than the first type of GPU.

The various resources of device 100 that might amount to at least one of the "full 3D cost" and the "partial 3D cost" may include, but is not limited to, time resources, power resources, memory resources, processing resources, and combinations thereof.

In some embodiments, each one of the "full 3D cost" and the "partial 3D cost" that may be returned by such a "CalculateCost" function may be an array of three elements, such as, for example, {area, context switch overhead, memory}. Each one of these elements of a "CalculateCost" function may be weighted based on various factors, such as the platform type of electronic device 100 executing the function, platform performance bottlenecks, power consumption, pixel density, user interface context, frame rate, and the like. An "area" element of such an array may be based on the pixel area of one or more graphical data layers to be rendered, which may affect the rendering time and power consumption for rendering the graphical data being analyzed. A "memory" element of such an array may be based on the amount of device storage that may be required to store one or more portions of the graphical data before and/or after it has been rendered by one or more types of GPU, which may be affected by the type of rendering operation performed on the graphical data being analyzed. A "context switch overhead" element of such an array may be based on the resources of device 100 that may be required to switch between providing a first portion of the graphical data to a first type of GPU and providing a second portion of the graphical data to a second GPU, which may be affected by whether certain GPUs are utilized in parallel or serially. Depending on how each of the elements of an array of a "CalculateCost" function may be weighted, the decision made at step 606 may vary.

In some embodiments, it may take device 100 a certain amount of time to switch the destination GPU of graphical data being rendered. Additionally or alternatively, it may take device 100 a certain amount of time or additional power to turn on a GPU that had previously been powered down, for example, due to inactivity. Whatever the reasons, context switch overhead may exist when system 201 switches between rendering data with a first GPU and rendering data with a second GPU. Therefore, while it may be more efficient to render different types of data with different types of GPU, the switch overhead that may be required to direct the different data types to different GPUs may reduce or even negate the amount of system resources that might otherwise be saved by using different GPUs. Accordingly, it may be more efficient to render all the graphical data generated by screen processing module 203 for a particular screen using a 3D-rendering GPU, despite the fact that the graphical data may include portions of 2D graphical data. Thus, in some embodiments, if the costs of doing two-dimensional rendering operations with a 3D-rendering GPU are smaller than the costs of context switching between a 3D-rendering GPU and a 2D-rendering GPU, then a particular screen may be rendered using just one or more GPUs of the 3D-rendering type.

As mentioned, steps 602 and 604 of process 600 may be accomplished, at least in part, by executing a "Calculate-Cost" function on the graphical data to be rendered and returning two arrays of cost (i.e., a "partial 3D cost" for a "partial 3D mode" and a "full 3D cost" for a "full 3D mode"). In some embodiments, each of these steps of process 600 may be explained in detail by the following pseudo-code outline. It is to be understood that this pseudo-code outline is provided by way of example only, and persons having ordinary skill in the art will recognize that other techniques, routines, or functions may be used to implement the functionality without departing from the spirit and scope of the invention. In this pseudo-code outline, the term "my_Partial3D_Cost" may stand for a "partial 3D cost" for a "partial 3D mode", and the term "my_Full3D_Cost" may stand for a "full 3D cost" for a "full 3D mode". In some embodiments, this pseudo-code outline may recursively traverse (e.g., depth first) the tree of layers of the graphical data to be rendered (see, e.g., tree 400 of FIG. 4) for calculating cost and returning the two arrays of cost.

```
/* Pseudo-code outline representation of
calculating cost functionality of process 600 */
    CalculateCost (current layer, parent layer requests
    3D)
        If current layer is null, then return 0 for both
        costs and exit.
        If the current layer requests 3D or the parent layer
        requests 3D, then "needs3D" is true.
        If needs3D is true, then:
            (1) child_Full3D_cost, child_Partial3D_cost =
        CalculateCost (child layer, true);
            (2) my_Partial3D_Cost = child_Partial3D_cost + {my
        layer area, one context switch, my layer memory
        used}; and
            (3) my_Full3D_Cost = child_Full3D_cost + {my layer
        area, 0 (no context switch), 0 (no memory)}.
        If needs3D is false, then:
            (1) my_Partial3D_Cost = child_Partial3D_cost + {0
        (no area), 0 (no context switch), 0 (no memory)}; and
            (2) my_Full3D_Cost = child_Full3D_cost + {my layer
        area, 0 (no context switch), 0 (no memory)}.
        Return two results:
            (1) my_Full3D_Cost; and
            (2) my_Partial3D_Cost.
```

Once such a "CalculateCost" function has been executed on the graphical data to be rendered, and once its "full 3D cost" and "partial 3D cost" results have been returned, decision processing module 205 may compare the results to pick a rendering mode to be utilized by device 100 (see, e.g., step 606 of process 600). For example, continuing with the example of executing such a "CalculateCost" function, if the "full 3D cost" result is determined to be greater than the "partial 3D cost" result, then graphical display system 201 may render the graphical data according to a first rendering mode (e.g., according to a "partial 3D mode"), otherwise, graphical display system 201 may render the graphical data according to a second rendering mode (e.g., according to a "full 3D mode").

Therefore, with continued reference to FIG. 6, if it is determined at step 606 that the first calculated cost is greater than the second calculated cost, process 600 may proceed to step 608, and the graphical data may be rendered using both the first type of graphics processing unit and the second type of graphics processing unit (e.g., a first portion of the graphical data may be rendered using a first type of graphics processing unit and a second portion of the graphical data may be rendered using a second type of graphics processing unit). For example, if the first calculated cost is determined to be greater than the second calculated cost at step 606, process 600 may proceed to step 608 and a first subset of the data layers of a generated screen of graphical data may be rendered using a first type of graphics processing unit (e.g., a 3D-rendering GPU) and a second subset of the data layers of the generated screen of graphical data may be rendered using a second type of graphics processing unit (e.g., a 2D-rendering GPU).

As a more specific example, if it is determined at step 606 that the first calculated cost is greater than the second calculated cost, process 600 may proceed to step 608 and at least some of the three-dimensional data layers of a generated screen of graphical data may be rendered by a 3D-rendering GPU (e.g., first GPU 211), and at least one of the two-dimensional data layers of the generated screen of graphical data may be rendered by a 2D-rendering GPU (e.g., second GPU 261) (i.e., using a "partial-3D mode" of system 201). In some embodiments, all of the two-dimensional data layers of the generated screen of graphical data may be rendered by a 2D-rendering GPU (e.g., second GPU 261) at step 608. Alternatively, in other embodiments, only a first subset of the two-dimensional data layers of the generated screen of graphical data may be rendered by a 2D-rendering GPU (e.g., second GPU 261) and a second subset of the two-dimensional data layers of the generated screen of graphical data may be rendered by a 3D-rendering GPU (e.g., first GPU 211).

Alternatively, if it is determined at step 606 that the first calculated cost is not greater than the second calculated cost, process 600 may proceed to step 610, and the graphical data may be rendered using only the first type of graphics processing unit. For example, if the first calculated cost is determined to not be greater than the second calculated cost at step 606, process 600 may proceed to step 610 and each one of the data layers of a generated screen of graphical data may be rendered by a 3D-rendering GPU (e.g., first GPU 211), regardless of whether a data layer is a three-dimensional data layer or a two-dimensional data layer (i.e., using a "full-3D mode" of system 201). In such an embodiment, none of the graphical data may be rendered by a 2D-rendering GPU (e.g., second GPU 261). Therefore, the determination made at step 606 may determine, for example, whether it would be more efficient for system 201 to render all the data layers of screen 300 using a 3D GPU (e.g., by proceeding to step 610) or whether it would be more efficient for system 201 to render at least some of the data layers of screen 300 using a 2D GPU and other data layers of screen 300 using a 3D GPU (e.g., by proceeding to step 608).

Therefore, in some embodiments, it may be calculated (e.g., by the above-listed pseudo-code) that at least one layer of graphical data that only requires rendering by a two-dimensional rendering operation should be rendered using a GPU type configured to more efficiently render three-dimensional data rather than two-dimensional data. This may occur, for example, when a parent layer acts as a container layer for its one or more children layers, and the parent layer may be used for ease of animation (e.g., if a parent layer is translated, all children layers of that parent layer may be translated by the same amount). That is, according to some optimization techniques, a parent layer may allocate memory and its children may be rendered into the allocated memory, such that when a parent layer is animated, each of the children may not need to be re-rendered individually (e.g., some of the children layers may be flattened into a parent layer before animating that parent layer). In some embodiments, process 600 may not only dynamically calculate the cost of rendering one or more children layers independently of its parent layer, but process 600 may also dynamically calculate the cost of flattening one or more children layers into its parent layer and then rendering that flattened content.

After the graphical data has been rendered at step 608 or step 610, process 600 may proceed to step 612 and the rendered data may be displayed.

It is to be understood that the steps shown in each one of processes 500 and 600 of FIGS. 5 and 6, respectively, are merely illustrative and that existing steps may be modified or omitted, additional steps may be added, and the order of certain steps may be altered.

Moreover, the processes described with respect to FIGS. 5 and 6, as well as any other aspects of the invention, may each be implemented by software, but can also be implemented in hardware or a combination of hardware and software. They each may also be embodied as computer readable code recorded on a computer readable medium. The computer readable medium may be any data storage device that can store data which can thereafter be read by a computer system. Examples of the computer readable medium include, but are not limited to, read-only memory, random-access memory, flash memory, CD-ROMs, DVDs, magnetic tape, and optical data storage devices (e.g., memory 104 of FIG. 1). The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method for processing graphical data comprising:
   identifying a characteristic of the graphical data, wherein the graphical data comprises: a first portion of graphical data that requires three-dimensional rendering and a second portion of graphical data that requires two-dimensional rendering;
   determining whether the characteristic meets a threshold;
   rendering, in response to a determination that the identified characteristic does not meet the threshold, the first portion of the graphical data and the second portion of the graphical data with a three-dimensional graphics processing unit and a two-dimensional graphics processing unit; and
   rendering, in response to a determination that the identified characteristic does meet the threshold, the first and second portions of graphical data with the three-dimensional graphics processing unit but not with the two-dimensional graphics processing unit.

2. The method of claim 1, wherein the characteristic is based on a ratio of a pixel area of the first portion of graphical data to a pixel area of all the graphical data.

3. The method of claim 1, wherein the characteristic is based on a ratio of a pixel area of the first portion of graphical data to a pixel area of the second portion of graphical data.

4. The method of claim 3, wherein the ratio is at least one.

5. The method of claim 1, wherein, in response to the determination that the identified characteristic does not meet the threshold, rendering the graphical data comprises:
   rendering the first portion of graphical data with the three-dimensional graphics processing unit; and
   rendering the second portion of graphical data with the two-dimensional graphics processing unit.

6. The method of claim 1, wherein, in response to the determination that the identified characteristic does not meet the threshold, rendering the graphical data comprises:
   rendering the first portion of graphical data with the three-dimensional graphics processing unit;
   rendering a first part of the second portion of graphical data with the three-dimensional graphics processing unit; and
   rendering a second part of the second portion of graphical data with the two-dimensional graphics processing unit.

7. The method of claim 1, further comprising displaying the rendered graphical data.

8. A method for processing graphical data comprising:
   calculating a first cost of rendering the graphical data using only a first type of graphics processing unit;

calculating a second cost of rendering the graphical data using both the first type of graphics processing unit and a second type of graphics processing unit;

determining whether the calculated first cost is greater than the calculated second cost;

in response to a determination that the calculated first cost is greater than the calculated second cost, rendering the graphical data using both the first type of graphics processing unit and the second type of graphics processing unit; and in response to a determination that the calculated first cost is not greater than the calculated second cost, rendering the graphical data using only the first type of graphics processing unit.

9. The method of claim 8, wherein the graphical data comprises:

a first portion of graphical data that requires three-dimensional rendering; and a second portion of graphical data that requires two-dimensional rendering.

10. The method of claim 9, wherein, in response to the determination that the calculated first cost is greater than the calculated second cost, rendering the graphical data comprises:

rendering the first portion of graphical data using the first type of graphics processing unit; and rendering the second portion of graphical data using the second type of graphics processing unit.

11. The method of claim 9, wherein, in response to the determination that the calculated first cost is greater than the calculated second cost, rendering the graphical data comprises:

rendering the first portion of graphical data using the first type of graphics processing unit;

rendering a first part of the second portion of graphical data using the first type of graphics processing unit; and rendering a second part of the second portion of graphical data using the second type of graphics processing unit.

12. The method of claim 9, wherein, in response to the determination that the calculated first cost is not greater than the calculated second cost, rendering the graphical data comprises:

rendering the first portion of graphical data using the first type of graphics processing unit; and rendering the second portion of graphical data using the first type of graphics processing unit.

13. The method of claim 9, wherein:

the first type of graphics processing unit is a three-dimensional graphics processing unit; and the second type of graphics processing unit is a two-dimensional graphics processing unit.

14. The method of claim 8, further comprising displaying the rendered graphical data.

15. The method of claim 8, wherein calculating the first cost comprises evaluating at least one of pixel area cost, context switch overhead cost, or memory cost of rendering the graphical data using only the first type of graphics processing unit.

16. The method of claim 8, wherein the calculating the second cost comprises evaluating at least one of pixel area cost, context switch overhead cost, or memory cost of rendering the graphical data using both the first type of graphics processing unit and a second type of graphics processing unit.

17. An electronic device comprising:

a screen processing module configured to generate graphical data, the graphical data comprising a first data portion of graphical data and a second data portion of graphical data, the first data portion comprising a first type of graphical data, and the second data portion comprising a second type of graphical data;

a decision processing module configured to determine if a first cost of rendering the graphical data according to a first mode of the device is greater than a second cost of rendering the graphical data according to a second mode of the device;

a first graphics processing unit configured to render:

the first data portion of graphical data and the second data portion of graphical data when the decision processing module determines that the first cost is not greater than the second cost; and at least the first data portion of graphical data when the decision processing module determines that the first cost is greater than the second cost; and a second graphics processing unit configured to render:

no portion of graphical data when the decision processing module determines that the first cost is not greater than the second cost; and at least some of the second data portion of graphical data when the decision processing module determines that the first cost is greater than the second cost.

18. The electronic device of claim 17, further comprising a display configured to present the data rendered by the first graphics processing unit and the data rendered by the second graphics processing unit.

19. The electronic device of claim 17, wherein:

the first graphics processing unit comprises a three-dimensional rendering graphics processing unit;

the second graphics processing unit comprises a two-dimensional rendering graphics processing unit;

the first type of data comprises three-dimensional graphical data; and the second type of data comprises two-dimensional graphical data.

20. The electronic device of claim 17, wherein the first cost is based on at least one of pixel area cost, context switch overhead cost, or memory cost of rendering the graphical data according to the first mode of the device.

21. The electronic device of claim 17, wherein the second cost is based on at least one of pixel area cost, context switch overhead cost, or memory cost of rendering the graphical data according to the second mode of the device.

* * * * *